Nov. 12, 1946.　　A. G. SILVESTER　　2,411,065
SPEED GOVERNING MECHANISM
Filed Aug. 7, 1944　　2 Sheets-Sheet 1
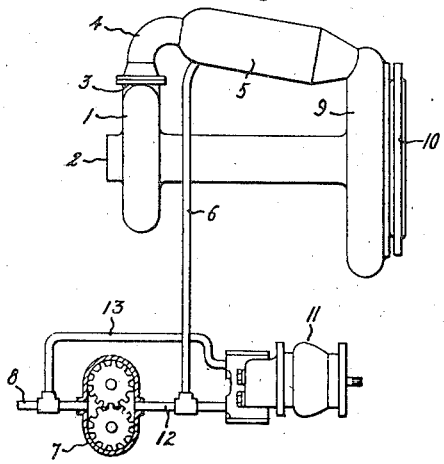
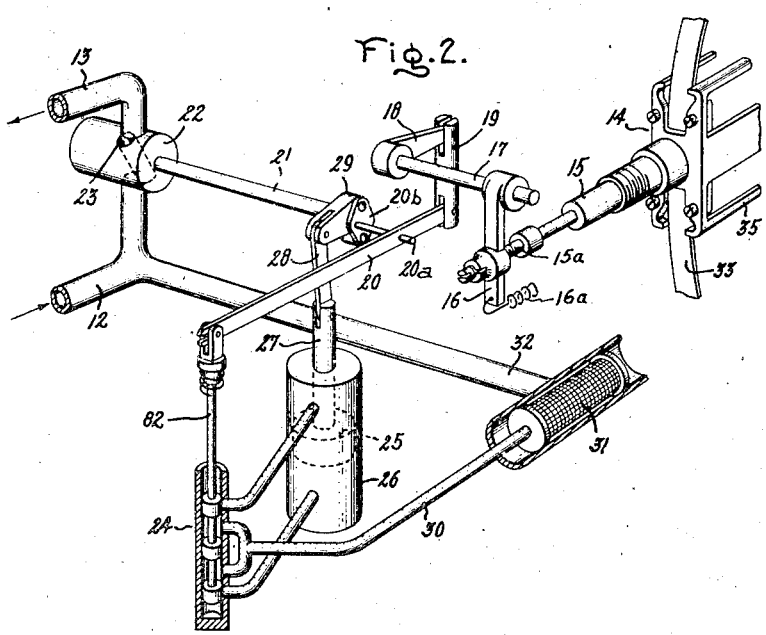
Inventor:
Austin G. Silvester,
by Harry E. Dunham
His Attorney.

Nov. 12, 1946. A. G. SILVESTER 2,411,065
SPEED GOVERNING MECHANISM
Filed Aug. 7, 1944 2 Sheets-Sheet 2
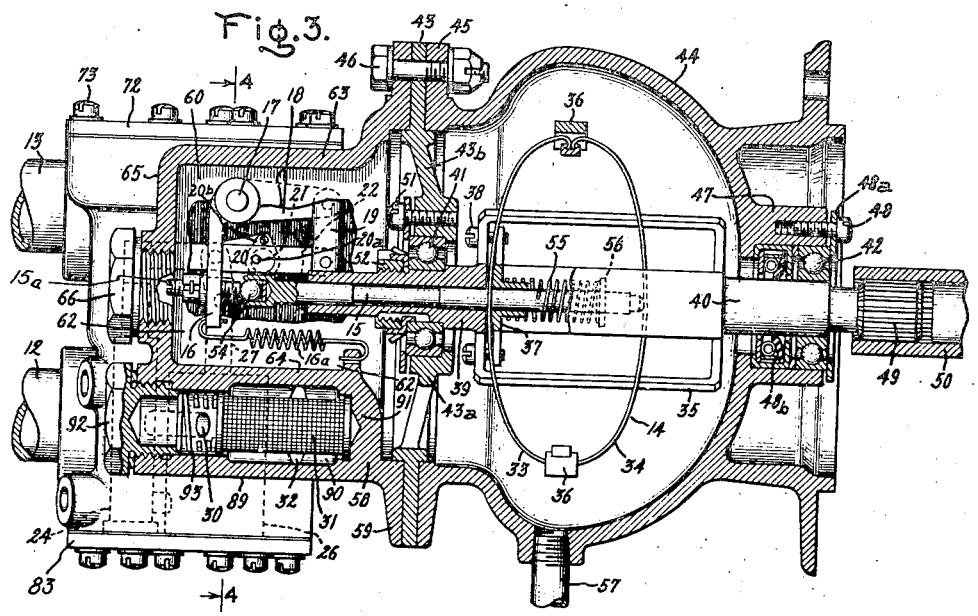
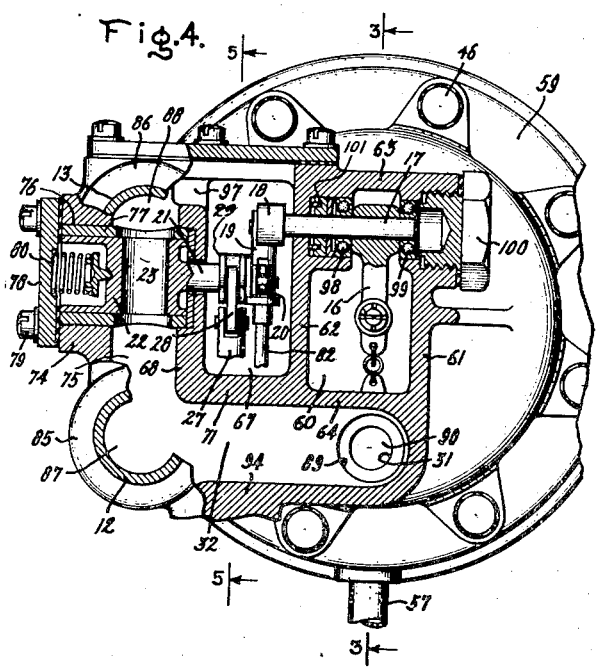
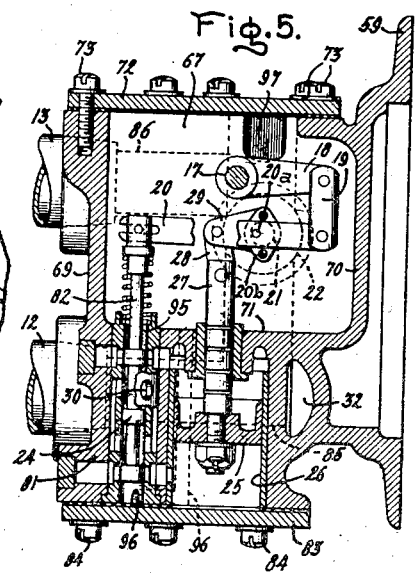
Inventor:
Austin G. Silvester,
by Harry E. Dunham
His Attorney.

Patented Nov. 12, 1946

2,411,065

UNITED STATES PATENT OFFICE 2,411,065

SPEED GOVERNING MECHANISM

Austin G. Silvester, Muroc, Calif., assignor to General Electric Company, a corporation of New York Application August 7, 1944, Serial No. 548,441

5 Claims. (Cl. 137—140)

1

The present invention relates to speed governing mechanisms wherein a flyball governor regulates the position of a control valve which in turn controls the speed of a prime mover. The invention is well adapted for use in gas turbine power plants and it is this application of my invention which I have elected to illustrate and describe. It is to be understood, however, that this is only by way of example and that the invention may be utilized wherever found applicable.

One object of the invention is to provide a governing mechanism which is very compact in structure and which may be attached to and detached from a prime mover as a unit.

Another object of the invention is to provide a governing mechanism which is simple in structure, capable of being manufactured at low cost, and in which the parts are readily accessible for inspection, readjustment or replacement.

Another object of the invention is to provide a governing mechanism which is made in parts, each part of which may be individually assembled and tested before the mechanism as a whole is assembled.

Further objects of the invention and its advantages will appear from the following specification.

In the drawings, Fig. 1 is a diagrammatic view of a power plant with the improved speed governing mechanism shown associated therewith; Fig. 2 is a diagrammatic view of the speed governing mechanism with the parts separated so that their functioning is readily apparent; Fig. 3 is a longitudinal sectional view of the governing mechanism, the section being taken on line 3—3, Fig. 4, and certain parts being broken away; Fig. 4 is a sectional view taken generally on line 4—4, Fig. 3, certain parts not in the section being indicated to more clearly illustrate the structure, and Fig. 5 is a sectional view taken on line 5—5, Fig. 4.

Referring to Fig. 1, there is shown diagrammatically a gas turbine power plant comprising a compressor 1 having an inlet 2 and a discharge conduit 3. Discharge conduit 3 is connected by a pipe line 4 to a combustion chamber 5. Fuel, such as oil, is supplied to the combustion chamber 5 through a pipe line 6 which is connected to the discharge side of a suitable fuel pump 7. The inlet side of fuel pump 7 is connected by a pipe line 8 to a suitable fuel supply tank. The products of combustion generated in combustion chamber 5 are supplied to a nozzle box 9 which in turn supplies the hot gases to a turbine wheel 10. Turbine wheel 10 is connected to the rotor of compressor 1 to drive it. The excess power in the combustion gases over that required to drive the compressor rotor may be used in any suitable manner. For example, it may be used to drive a load such as an electric generator. All the energy of the gases may be extracted from them in turbine wheel 10, the useful load being then driven from the turbine shaft, or the exhaust gases may be used in a separate turbine or other device for generating power. The arrangement illustrated is diagrammatic and is intended to be representative of any gas turbine power plant and in connection with which a governing mechanism may be required.

In the present instance, a governing mechanism, indicated generally by the reference character 11, is utilized to control a by-pass valve which by-passes fuel from the discharge side of the pump back to the inlet side. It comprises a speed governor which regulates a suitable valve, the valve regulating flow from pipe line 12 to pipe line 13. In actual practice, the governing mechanism is bolted directly to a part of the power plant casing and is driven by the power plant at a speed proportional to that of the power plant. In the present instance, the governing mechanism is in the nature of an overspeed or emergency governing means, it coming into action only to prevent the speed of the prime mover from exceeding a predetermined high value. The load on the prime mover may be regulated by other means, not shown.

It is to be understood that the governor may also be used for speed control of the prime mover at other speeds than overspeed.

Fig. 2 shows diagrammatically, and with parts separated, the moving parts of the speed governing mechanism. It will be described first since an understanding of the functioning of the mechanism will assist in understanding the specific mechanical construction shown in Figs. 3, 4 and 5. 14 indicates a speed governor which may be of the flyball type, the spindle 15 of which is arranged so that its end engages the end of an adjustable screw 15ª which threads through an opening in the end of a lever arm 16 fixed on a shaft 17. The end of screw 15ª is held against the end of spindle 15 by a spring 16ª. Also fixed on shaft 17 is a lever arm 18 which through a link 19 is pivotally connected to one end of a floating lever 20 pivoted on a pin 20ª fixed eccentrically to the end of a rotatable shaft 21 on the other end of which is a valve body 22. In valve body 22 is an opening 23 adapted to connect conduits 12 and 13 together. In other words, valve body 22 controls the flow of fluid between conduits 12 and 13. The other end of floating lever 20 is connected to the pilot valve 24 of an hydraulic motor the piston of which is indicated at 25. Piston 25 is located in a cylinder 26 and is carried by a piston rod 27 which is pivotally connected by a link 28 to a crank arm 29 fixed on shaft 21. Actuating fluid is supplied to pilot valve 24 through a conduit 30 connected to the interior of an oil strainer 31, the space around the oil strainer 31 being connected by a conduit 32 to the discharge side of pump 7, i. e., to pipe line 12. Upon increase and decrease in speed, the speed governor turns shaft 17 which in turn moves the pilot to admit actuating fluid to cylinder 26 on one side or other of piston 25, permitting fluid to escape from the other side. The piston is then moved to turn shaft 21 to adjust the position of valve body 22, movement of the valve body in turn restoring the pilot valve through eccentric pin 20$^a$, this being a known form of follow-up connection. Preferably, eccentric pin 20$^a$ is carried by an eccentric plate 20$^b$ attached by screws to lever 29, so that by changing plates, the eccentricity of the pin may be changed thus adjusting the restoring ratio of the governing mechanism. The use of a speed governor to control the positioning of a valve through the intermediary of an hydraulic motor and linkages including a follow-up connection is known. My invention has to do specifically with the mechanical arrangement of these parts in a simple, compact structure. This structure is shown in Figs. 3, 4 and 5 which will now be described.

The speed governor comprises two curved spring strips 33 and 34 which extend transversely of a rectangular frame 35 (see Fig. 2) and are fastened at their ends to flyweights 36. The one spring 33 is fixed at its central portion to one end of frame 35 by a clamping piece 37 held in place by screws 38. Otherwise, the springs 33 and 34 and the flyweights are free to move. At opposite ends of frame 35 are stub shafts 39 and 40 supported in ball bearings 41 and 42. Ball bearing 41 is supported in a spider comprising a ring 43 connected to a bearing supporting hub 43$^a$ by spokes 43$^b$. It is attached to the open side of a governor housing 44, the governor housing being provided with a flange 45 to which ring 43 is fastened by a ring of bolts 46. Ball bearing 42 is carried in a wall of governor housing 44 opposite spider 43. It is positioned in a ball bearing housing 47, the bearing being held in the housing by a ring of bolts 48 and a washer 48$^a$. At 48$^b$ is a packing. On the outer end of stub shaft 40 is a splined head 49 adapted to be connected to a suitable driving shaft 50. Ball bearing 41 is held in place in spider 43 by a ring of bolts 51 and by a nut 52 which threads on an extension of stub shaft 39. Stub shaft 39 and its extension are hollow and projecting therethrough is the governor spindle 15 which at its outer end is provided with a ball 54 held in a pocket in the end of the spindle. The end of screw 15$^a$ engages ball 54. The other end of spindle 15 engages with the central portion of spring 34. It is biased to a position in engagement with said spring by a coiled spring 55 located between clamping plate 37 and a collar 56 on the governor spindle. Connected with governor housing 44 is a drainpipe 57. The flyball governor is more specifically described and claimed in an application Serial No. 553,611, filed September 11, 1944, in the name of Donald F. Warner and assigned to the same assignee as the present application.

The flyball governor structure and its housing so far described form a unitary structure which can be assembled and tested as a unit. As will be clear, the stub shaft 39 with the speed governor assembly thereon may be first assembled in spider 43 after which the spider may be mounted on the governor housing, stub shaft 40 being inserted through bearing 42 which has previously been assembled in bearing housing 47.

The valve structure and leverage mechanism are carried in a second housing 58 which has a flange 59 by which it is attached to flange 45 by the bolts 46. Housing 58 is provided with walls which define a pocket 60 having an open side which faces toward spider 43. Pocket 60 is rectangular in cross section, its two side walls being indicated at 61 and 62, its two end walls at 63 and 64 and its bottom wall at 65. In bottom wall 65 is an opening closed by a plug 66. Pocket 60 houses lever arm 16.

Adjacent to pocket 60 are walls which define a second pocket 67, the two pockets having the common side wall 62. The other side wall of pocket 67 is indicated at 68, its two end walls at 69 and 70, and its bottom wall at 71. Pocket 67 has an open side opposite bottom wall 71 which is closed by a cover plate 72 fixed in position by screws 73. The open side of pocket 67 is at right angles to the open side of pocket 60. In Fig. 3, wall 62 is shown partly broken away to show parts located in pocket 67.

Adjacent to wall 68 of pocket 67 are walls 74 which define a passage 75 which extends along wall 68 and has an open end which is covered also by cover plate 72. At one side of passage 75 are walls which define a round passage 76 which extends across passage 75 at right angles thereto and in which is located a valve liner 77 in which valve 22 is located. The outer end of passage 76 is closed by a cover plate 78 held in place by screws 79. In liner 77 are openings adapted to stand in line with the opening 23 through valve body 22. Between cover plate 78 and the valve body is a suitable spring 80 which serves to hold the valve body against the bottom of a shallow recess formed in wall 68. The stem 21 of valve body 22 projects through wall 68 into pocket 67.

Formed integral with bottom wall 71 on the side opposite to pocket 67 are walls which define the cylinder 26 and a pilot valve casing 81. As shown in Fig. 5, piston rod 27 and the pilot valve stem 82 project through wall 71 into pocket 67. The open outer ends of cylinder 26 and pilot valve casing 81 are closed by a cover plate 83 held in place by screws 84.

Adjacent to the walls which define passage 76 and on opposite sides thereof are rounded walls 85 and 86 which define inlet and outlet conduits 87 and 88 with which pipe lines 12 and 13 connect. Conduits 87 and 88 are connected by passage 75. In Fig. 4, pipe lines 12 and 13 are indicated for purposes of illustration although they would not show in true section on line 4—4, Fig. 3.

Extending across wall 64 in a direction parallel with wall 85 is a rounded wall 89 which forms a well 90 for strainer 31. The inner end of well 90 is closed by a wall 91 and its outer open end is closed by a plug 92 which holds in place a spring 93 the purpose of which is to hold the strainer on its seat. The conduit 32 which connects well 90 with inlet pipe line 12 is formed by a rounded wall 94 beneath wall 64 as shown in Fig. 4. The conduit 30 which connects the inside of the strainer to the pilot valve casing is shown in Fig. 3. Thus it will be seen, (referring particularly to Figs. 3 and 4) that liquid entering through pipe line 12 may flow by way of passage 87 to passage 75, thence through valve body 22 to passage 88 and out by way of pipe line 13. At the same time liquid for the hydraulic motor may flow from passage 87 through branch conduit 32 to well 90, thence through the strainer 31 and conduit 30 to the pilot valve. The spaces above and below the pilot valve heads are connected to pocket 67 by passages 95 and 96 (Fig. 5) so that flow of actuating liquid from the cylinder 26 is discharged to pocket 67. Also, any leakage of liquid around piston rod 27 or pilot valve stem 82 is discharged to pocket 67. In wall 68 is an overflow opening 97 which connects pocket 67 to outlet conduit 88 so that liquid accumulating in pocket 67 will find its way out to the outlet conduit.

Shaft 17 is mounted in suitable bearings 98 and 99 which are accessible through an opening in wall 61 closed by a plug 100. The one end of shaft 17 projects through wall 62 into pocket 67. The lever arm 18, link 19, floating lever 20, link 28 and lever arm 29 all are located in chamber 67. Also the one end of shaft 21 is in chamber 67, it projecting through wall 68.

Mounted on shaft 17 where it passes through wall 62 is a seal 101 to prevent leakage of fluid, (which may be under low pressure), from chamber 67 into chamber 60, thereby preventing excessive leakage out pipe 57 and also preventing accumulation of liquid in housing 44 where it might interfere with rotation of speed governor weights 36. Drain pipe 57 serves to carry away to any suitable point any fluid which leaks into governor housing 44. Viewed from one aspect, wall 62 forms a dam to keep liquid from getting into chamber 60 and hence finding its way into the speed governor housing 44.

By my invention, I provide a speed governing mechanism wherein the speed governor is located in one casing part and may be assembled as a unit and tested, and wherein the leverage mechanism, the hydraulic motor and the valve may be assembled in another casing part and be separately adjusted and tested. Afterwards, the two casing parts may be bolted together and the mechanism as a unit attached to the machine to be controlled. It will be noted in connection with the parts contained in casing section 58 that all may be assembled through the outside of the casing part and that all parts are readily accessible for inspection, repair and replacement.

In assembling the mechanism contained in casing part 58, lever arm 16 may be positioned through the open end of pocket 60 between its bearings 98 and 99 after which shaft 17 may be inserted through the opening provided by plug 11. After shaft 17 has been inserted, plug 100 may be put in position. At any time, the setting of the governor may be changed by removing plug 66 and adjusting screw 15ᵃ; and this adjustment can be made readily while the governor is operating. The leverage mechanism located in pocket 67 may be assembled through the open side of the pocket, the valve being inserted through passage 76 and the piston and pilot valve being inserted from the outside into their respective casings. After the parts are in position, cover plates 72, 78 and 83 may be fastened in place. The strainer 31 is inserted through the open end of well 80 after which the plug 92 may be put in place. This arrangement makes for ease in assembling the construction and renders all the parts readily accessible. Furthermore, the construction is compact which has the advantage that it may be built so as to be relatively light in weight, a thing especially important where the mechanism is to be used in connection with a power plant on an aircraft.

What I claim as new and desire to secure by Letters Patent of the United States, is:

1. In combination, a governor housing having an open side, a bolting flange opposite said open side, and a bolting flange surrounding the open side, a flyball governor mounted in the governor housing having a spindle which projects out through said open side, a second housing fastened to said last-named bolting flange having walls which define a pocket, the open side of which faces toward the open side of the governor housing and into which the end of the governor spindle projects, walls defining a pocket adjacent to said first-named pocket having an open side facing in a direction other than that in which the first-named pocket faces, walls defining inlet and outlet passages connected by a transverse passage, walls defining a valve casing extending transversely of said transverse passage, and walls defining piston and pilot valve cylinders having open ends which face outwardly, a valve in said valve casing having a shaft the end of which projects into said second-named pocket, a lever arm in the first-named pocket with which the end of said governor spindle engages, a shaft for said lever arm an end of which projects into said second-named pocket, a piston and a pilot valve in said piston and pilot valve cylinders respectively having shaft ends which project into said second-named pocket, leverage mechanism in said second-named pocket which connects together the shaft ends therein, and cover plates for said second-named pocket, said cylinders and said valve casing.

2. In combination, a governor housing having an open side, a flyball governor mounted in the governor housing having a spindle which projects out through said open side, a second housing fastened to said governor housing having walls which define a pocket, the open side of which faces toward the open side of the governor housing and into which the end of the governor spindle projects, walls defining a pocket adjacent to said first-named pocket having an open side facing in a direction other than that in which the first-named pocket faces, walls defining inlet and outlet passages connected by a transverse passage, and walls defining a valve casing extending transversely of said transverse passage, a valve in said valve casing having a shaft the end of which projects into said second-named pocket, a lever arm in the first-named pocket with which the end of said governor spindle engages, a shaft for said lever arm an end of which projects into said second-named pocket, leverage mechanism in said second-named pocket which connects together the shaft ends therein, and cover plates for said second-named pocket and said valve casing whereby by the removal of said cover plates access may be obtained to said valve casing and to said second-named pocket.

3. In combination, a governor housing having an open side, a governor mounted in the governor housing having a spindle which projects out through said open side, a second housing fastened to said governor housing having walls which define two pockets, one having an open side which faces toward the open side of the governor housing and into which the end of the governor spindle projects and the other having an open side facing in a direction other than that in which the first-named pocket faces, walls defining inlet and outlet passages connected by a transverse passage, and walls defining a valve casing extending transversely of said transverse passage, a valve in said valve casing having a shaft the end of which projects into said second-named pocket, a lever arm in the first-named pocket with which the end of said governor spindle engages, a shaft for said lever arm an end of which projects into said second-named pocket, leverage mechanism in said second-named pocket which connects together the shaft ends therein, cover plates for said second-named pocket and said valve casing, and walls which define an overflow passage connecting said second-named pocket to the said outlet passage.

4. In combination, a governor housing, a second housing connected to the governor housing, a governor mounted in the governor housing having a spindle which projects into said second housing, walls defining in said second housing a pocket having an open side, inlet and outlet passages connected by a transverse passage, a valve casing extending transversely of said transverse passage, and piston and pilot valve cylinders having open ends which face outwardly, a valve in said valve casing having a shaft the end of which projects into said pocket, a lever arm with which the end of said governor spindle engages, a shaft for said lever arm an end of which projects into said pocket, a piston and a pilot valve in said piston and pilot valve cylinders respectively having shaft ends which project into said pocket, leverage mechanism in said pocket which connects together the shaft ends therein, and cover plates for said pocket, said cylinders and said valve casing.

5. In combination, a casing, having two unitary separable parts, one of which forms a governor housing and the other a leverage and valve housing, a governor supported in the governor housing having a longitudinally slidable spindle with a free end which projects into the leverage and valve housing, walls in the leverage and valve housing which define a pocket having an open side and piston and pilot valve cylinders each being open at the end remote from said pocket, a rotatable valve in the leverage and valve housing having a shaft which projects into said pocket, a piston and a pilot valve in said cylinders having shafts which project into said pocket, leverage mechanism in said pocket which connects said shaft ends together and is loosely engaged by the face end of said governor spindle for actuation thereby, a first cover plate for the open side of said pocket and a second common cover plate for the open ends of said cylinders.

AUSTIN G. SILVESTER.